United States Patent [19]

Domeier et al.

[11] Patent Number: 4,579,885

[45] Date of Patent: Apr. 1, 1986

[54] EPOXY COMPOSITIONS CONTAINING SUBSTITUTED DIAMINE HARDENERS

[75] Inventors: Linda A. Domeier; Hugh C. Gardner, both of Somerville; George T. Kwiatkowski, Green Brook, all of N.J.

[73] Assignee: Union Carbide Corporation, Danbury, Conn.

[21] Appl. No.: 534,649

[22] Filed: Sep. 22, 1983

[51] Int. Cl.[4] .................... C08G 59/50; C08G 59/52
[52] U.S. Cl. .................................... 523/400; 428/413;
    523/445; 523/457; 523/459; 523/468; 525/420;
    525/423; 525/463; 528/98; 528/109; 528/112;
    528/124
[58] Field of Search ............... 528/109, 112, 124, 98;
    525/420, 423, 463; 523/400, 457, 459, 468, 445;
    428/413

[56] References Cited

U.S. PATENT DOCUMENTS

| | | | |
|---|---|---|---|
| 3,349,060 | 10/1967 | Lewis et al. | 528/124 X |
| 3,681,290 | 8/1972 | Meckel et al. | 528/61 X |
| 3,895,064 | 7/1975 | Brode et al. | 564/315 |
| 3,920,768 | 11/1975 | Kwiatkowski | 528/99 X |
| 3,950,451 | 4/1976 | Suzuki et al. | 528/124 X |
| 3,984,370 | 10/1976 | Shinohara et al. | 525/523 X |
| 4,517,321 | 5/1985 | Gardner et al. | 523/400 |

OTHER PUBLICATIONS

*Composites*, Jul. 1981, pp. 201–205, Wright.
Chem. Abstracts, vol. 95, 1981, 116111c, Adduci et al.
Chem. Abstracts, 10th Collective Index, 1977–1981.
Chem. Abstracts, vol. 81, 1974, 121073q, Popov et al.
Chem. Abstr., vol. 90, 1979, 39660y, Yokoyama et al.
Chem. Abstr., vol. 91, 1979, 158766t, Miyadera et al.
Derwent Publications 71359A/40, Hitachi, Aug. 28, 1978.

*Primary Examiner*—Howard E. Schain
*Attorney, Agent, or Firm*—Morris N. Reinisch

[57] ABSTRACT

Described herein is a composition comprising a select group of substituted diamine hardeners and an expoxy resin containing two or more 1,2-epoxide groups per molecule. These compositions exhibit reduced moisture absorption, and controlled reactivity which comprises the processing characteristics of the composition.

40 Claims, No Drawings

EPOXY COMPOSITIONS CONTAINING SUBSTITUTED DIAMINE HARDENERS

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State-of-the-art epoxy/carbon fiber composites have high compressive strengths, good fatigue characteristics, and low shrinkage during cure. Most epoxy formulations, however, absorb moisture which reduces their high temperature properties. Thus there is a need for resin systems which afford composites with reduced moisture absorption.

Furthermore, it is required to prepare a homogeneous solution of the epoxy and amine hardener prior to use. In the case of solid amine hardeners this requires dissolution of the amine hardener in the epoxy. There are therefore particular advantages to amine hardeners which can be easily and rapidly dissolved without prolonged or extensive heating. In addition, there is a need to control the reactivity of amine hardeners such that prepregs prepared from these epoxy solutions retain their tack and processability for extended periods of time.

THE INVENTION

It has now been found that a composition which contains a specific group of hardeners, when used with epoxy compounds, exhibits reduced moisture absorption, improved solubility, and in certain cases, controlled reactivity, which improves the processing characteristics of the composition.

The composition of this invention comprises:
(a) a select group of substituted diamine hardeners, and
(b) an epoxy resin containing two or more 1,2-epoxide groups per molecule.

These compositions may optionally contain
(c) a thermoplastic polymer, and/or
(d) a structural fiber.

The hardeners which are used in this invention are represented by the following general formulas:

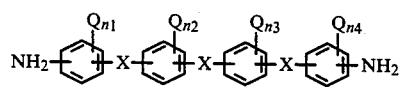

wherein the X's are independently selected from a direct bond, O, S, $SO_2$, CO, COO, $C(CF_3)_2$, $C(R_1R_2)_2$ wherein $R_1$ and $R_2$ are independently hydrogen or alkyl of 1 to 4 carbon atoms, Q is alkyl of 1 to 4 carbons atoms, $n_1$ through $n_4$ are independently 0 to 4 with the proviso that at least one of the n's is one or greater.

The preferred hardeners are selected from one or more of the following compounds:

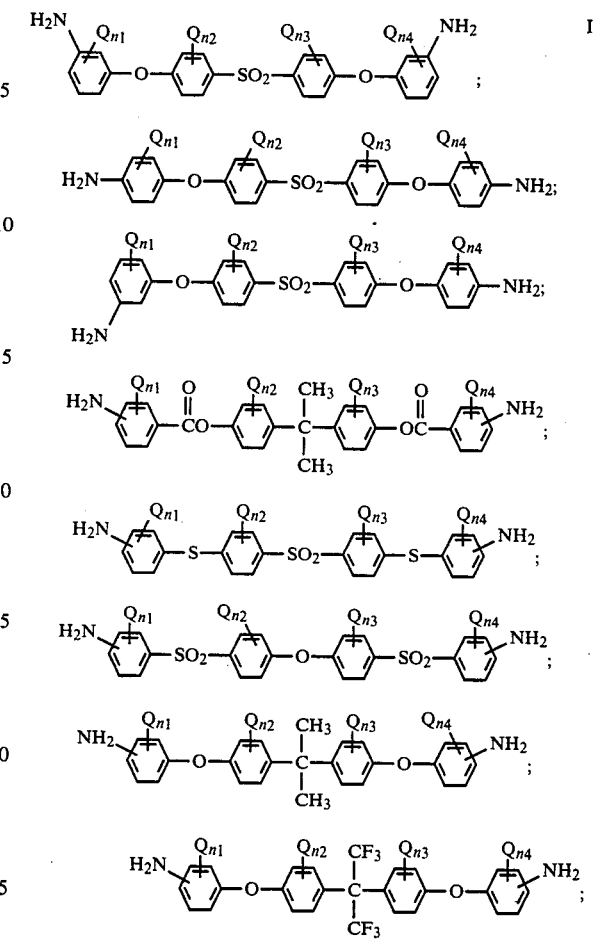

The diamines of this invention may be prepared by condensing an aminophenol and a dihalobenzenoid compound at elevated temperature in the presence of base in a dipolar aprotic solvent. Suitable aminophenols include m-aminophenol, p-aminophenol, 4-aminothiophenol, and 4-amino-3-methylphenol. Useful dihalobenzenoid compounds include 4,4'-dichlorodiphenyl sulfone, 4,4'-difluorobenzophenone, 4,4'-dichlorobenzophenone, 2,6-dichlorobenzonitrile, 1,2,4,5,-tetrachlorobenzene, hexachlorobenzene, and the like.

It is a requirement of this invention that the aminophenol or the dihalobenzenoid compound, or both, contain at least one alkyl substituent on an aromatic ring.

Bases which may be used include sodium hydroxide, potassium hydroxide, sodium carbonate, sodium bicarbonate, and the like. Dimethyl sulfoxide, N,N-dimethyl acetamide, N-methyl pyrrolidinone, sulfolane and dimethyl sulfone are suitable solvents. An azeotropic solvent such as toluene or chlorobenzene is preferably added to the mixture to assist in removal of water from the reaction mixture.

The preparation of the diamines of this invention may be carried out as described in U.S. Pat. No. 3,895,064. Alternatively the process conditions in British Pat. No. 1,492,366 may be used. Reaction times are typically 8 to 30 hours or more at temperatures of 140° to 170° C.

The diamines may be prepared by a one-step process in which the aminophenol and dihalobenzenoid compound and base are charged simultaneously to the reactor. Alternatively, a two step process may be used, in which the aminophenol and base are reacted initially to form phenoxide salts, prior to addition of the dihalobenzenoid compound.

The diamines may also be prepared in a multistep process. In the first step a halonitrobenzene and dihydric phenol are condensed in the presence of base to form a nitro-terminated oligomer.

In this process the halonitrobenzene may be p-chloronitrobenzene, m-chloronitrobenzene, p-fluoro nitrobenzene, m-bromonitrobenzene, and the like.

Suitable aromatic diphenols include bisphenol A, hydroquinone, resorcinol, 4,4'-biphenol, 4,4'-dihydroxydiphenyl sulfone, 4,4'-dihydroxydiphenyl sulfide, 4,4'-dihydroxy-3,3', 5,5'-tetramethyldiphenyl sulfide, 4,4'-dihydroxy-3,3',5,5'-tetramethyldiphenyl sulfone, and the like.

The bases and solvents used would be similar to those described above for the reaction of aminophenols with dihalobenzenoid compounds.

It is required in this case that the halonitrobenzene or the dihydric phenol or both contain at least one alkyl substituent on an aromatic ring.

The second step in the preparation of the diamine is the reduction of the terminal nitro groups to amino groups. This process may be carried out using methods known in the art-e.g., using hydrogen and a metal catalyst such as Fe or Ni, or by using stannous chloride and hydrochloric acid.

The diamines of this invention may be used in combination with conventional aromatic diamines. Examples of conventional diamines include 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, m-phenylendediamine, p-phenylenediamine, 4,4'-diaminnodiphenylpropane, 4,4'-diaminodiphenyl sulfide, 1,4-bis(p-aminophenoxy)benzene, 1,4-bis(m-aminophenoxy)benzene, 1,3-bis(m-aminophenoxy)benzene, 1,3-bis(p-aminopheoxy)benzene, 4,4'-bis(3-aminophenoxy)diphenyl sulfone, and trimethylene glycol di-4-aminobenzoate. Also, the hardeners of this invention may be used in combination with the diamine hardeners disclosed in U.S. patent application Ser. No. 496,504 filed on May 20, 1983 in the name of H. C. Gardner et al.

The epoxy resins which may be used herein contain two or more epoxy groups having the following formula:

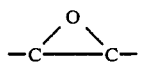

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as bisphenol A, and have structures such as II:

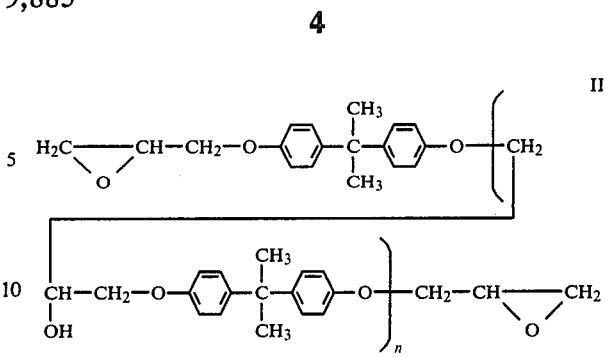

where n has a value from about 0 to about 15. These epoxides are bisphenol-A epoxy resins. They are available commercially under the trade names such as "Epon 828," "Epon 1001", and "Epon 1009" from Shell Chemical Co., and as "DER 331", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl)methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated bisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as III where n=0.1 to 8 and cresol-formaldehyde novolaks such as IV where n=0.1 to 8 are also useable.

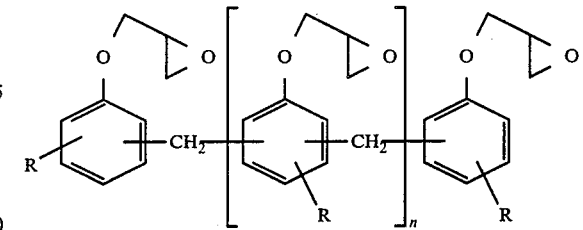

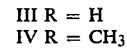

III R = H
IV R = CH₃

The former are commercially available as D.E.N. 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, NY). Other epoxidized novolaks such as SU-8 (obtained from Celanese Polymer Specialties Company, Louisville, KY) are also suitable.

Other polyfunctional active hydrogen compounds besides phenols and alcohols may be used to prepare the polyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., V) N,N,N',N'-tetraglycidyl-bis(methylamino) cyclohexane (i.e. VI), N,N,N',N'-tetraglycidyl-4,4'-diaminodiphenyl methane, (i.e. VII) N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, CA.), Araldite MY-720 (obtained from Ciba Geigy Corporation) and PGA-X and PGA-C (obtained from The Sherwin-Williams Co., Chicago, Ill.).

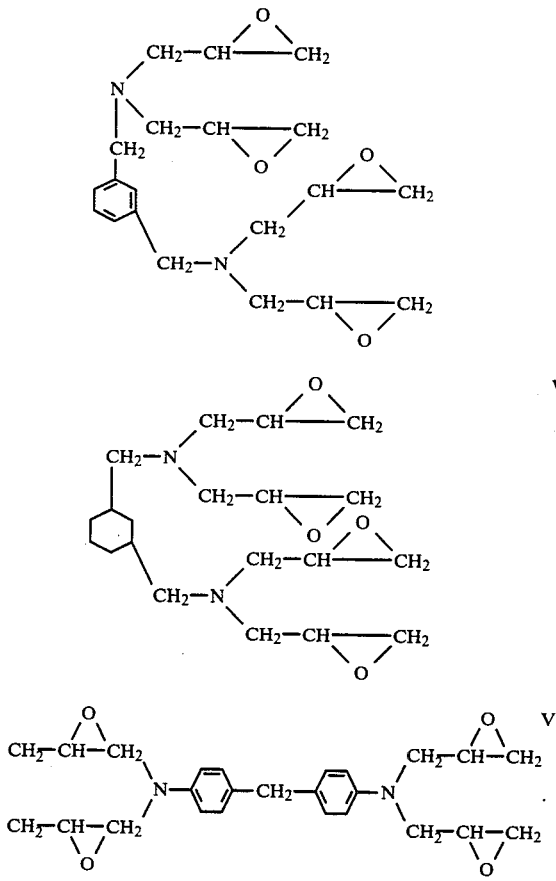

Suitable polyglycidyl adducts derived from amino alcohols include O,N,N-triglycidyl-4-aminophenol, available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane) are also useable.

The second group of epoxy resins is prepared by epoxidation of dienes or polyenes. Resins of this type include bis(2,3-epoxycyclopentyl)ether, VIII,

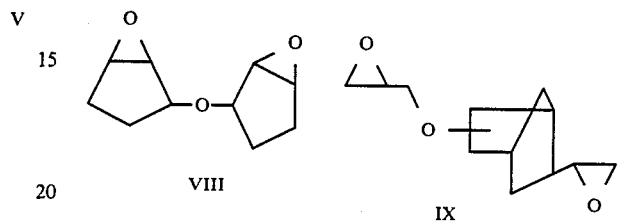

reaction products of VIII with ethylene glycol which are described in U.S. Pat. No. 3,398,102, 5(6)-glycidyl-2-(1,2-epoxyethyl)bicyclo[2.2.1]heptane, IX, and dicyclopentadiene diepoxide. Commercial examples of these epoxides include vinycyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl)adipate, e.g., "ERL-4289" (obtained from Union Carbide Corp.), dipentene dioxide, e.g., "ERL-4269" (obtained from Union Carbide Corp.) 2-(3,4-epoxycyclohexyl-5,5-spiro-3,4-epoxy)cyclohexanemetadioxane, e.g., "ERL-4234" (obtained from Union Carbide Corp.) and epoxidized polybutadiene, e.g., "Oxiron 2001" (obtained from FMC Corp.)

Other suitable cycloaliphatic epoxies include those described in U.S. Pat. Nos. 2,750,395; 2,890,194; and 3,318,822 which are incorporated herein by reference, and the following:

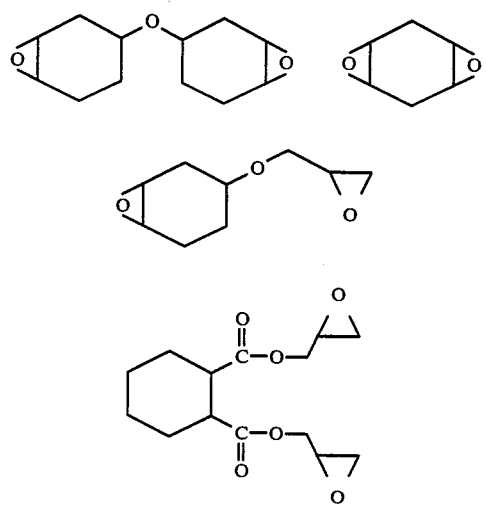

-continued

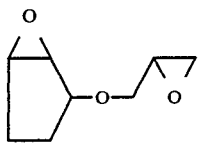

Other suitable epoxides include:

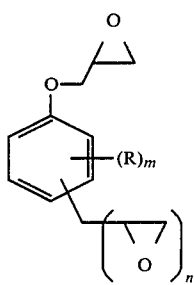 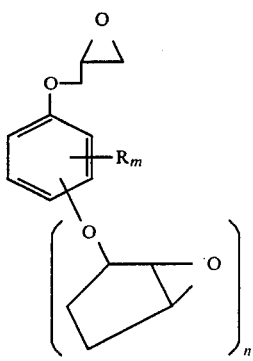

where n is 1 to 4, m is (5-n), and R is H, halogen, or $C_1$ to $C_4$ alkyl.

Reactive diluents containing one epoxide group such as t-butylphenyl glycidyl ether, may also be used. The reactive diluent may comprise up to 25 percent by weight of the epoxide component.

The preferred epoxy resins are bis(2,3-epoxycyclopentyl)ether, bisphenol A epoxy resins of formula II where n is between 0 and 5, epoxidized novolak resins of formula III and IV where n is between 0 and 3, N,N,N',N'-tetraglycidyl xylylene diamine, mixtures of bis(2,3-epoxycyclopentyl)ether with II, III, or IV, and N,N,N',N'-tetraglycidyl 4,4'-diamino diphenyl methane.

The compositions of this invention may optionally contain a thermoplastic polymer (component c). These materials have beneficial effects on the viscosity and film strength characteristics of the epoxy/hardener mixture (i.e., components a and b).

The thermoplastic polymers used in this invention include polyarylethers of formula X which are described in U.S. Pat. Nos. 4,108,837 and 4,175,175,

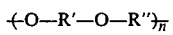  X wherein R' is a residuum of a dihydric phenol such as bisphenol A, hydroquinone, resorcinol, 4,4-biphenol, 4,4'-dihydroxydiphenyl sulfone, 4,4'-dihydroxy-3,3' 5,5'-tetramethyldiphenyl sulfide, 4,4'-dihydroxy-3',3',5,5'-tetramethyldiphenyl sulfone and the like. R" is a residuum of a benzenoid compound susceptible to nucleophilic aromatic substitution reactions such as 4,4'-dichlorodiphenyl sulfone, 4,4'-difluorobenzophenone, and the like. The average value of n is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of formula XI.

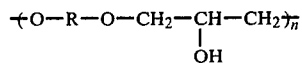  XI where R has the same meaning as for Formula X and the average value of n is between about 8 and about 300; and polycarbonates such as those based on bisphenol A, tetramethyl bisphenol A, 4,4'-dihyroxydiphenyl sulfone, 4,4'-dihydroxy-3,3',5,5'-tetramethyl-diphenyl sulfone, hydroquinone, resorcinol, 4,4'-dihydroxy-3,3',5,5'-tetramethyl diphenyl sulfide, 4,4'-biphenol, 4,4'-dihydroxydiphenyl sulfide, phenolphthalein, 2,2,4,4-tetramethyl-1,3-cyclobutane diol, and the like. Other suitable thermoplastics include poly($\epsilon$-caprolactone); polybutadiene; polybutadiene/acrylonitrile copolymers, including those optionally containing amine, carboxyl, hydroxy, or —SH groups; polyesters, such as poly(butylene terephthalate); poly(ethylene terephthalate); polyetherimides such as the Ultem resins (obtained from the General Electric Company); acrylonitrile/butadiene/styrene copolymers, polyamides such as nylon 6, nylon 6,6, nylon 6,12, and Trogamid T (obtained from Dynamit Nobel Corporation); poly(amide imides) such as Torlon poly(amide imide) (obtained from Amoco Chemical Corporation, Napierville, IL); polyolefins, polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like.

The composition may additionally contain an accelerator to increase the rate of cure. Accelerators which may be used herein include Lewis acid:amine complexes such as $BF_3$.monoethylamine, $BF_3$.piperdine, $BF_3$.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid:imidazole complex, salts of trifluoro methane sulfonic acid, such as FC-520 (obtained from 3M Company), organophosphonium halides and dicyandiamide.

The structural fibers (i.e. component d) which are useful in this invention include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. duPont de Nemours, Inc., Wilmington, DE), and silicon carbide fibers.

The compositions contain 5 to 70 weight percent, preferably 15 to 60 percent, of hardener (i.e., component a), 5 to 75 percent, preferably 10 to 50 percent, of component b, and 0 to about 25 percent, preferably 0 to 15 percent by weight of component c, and 0 to 85 percent, preferably 20 to 80 percent of component d.

Preimpregnated reinforcement may be made from the compositions of this invention by combining components (a+b) with d or components (a+b+c) with d.

Preimpregnated reinforcement may be prepared by several techniques known in the art, such as wet winding or hot melt. In one method of making impregnated tow or undirectional tape, the fiber is passed into a bath of the epoxy/hardener mixture. A non-reactive, volatile solvent such as methyl ethyl ketone may be optionally included in the resin bath to reduce viscosity. After impregnation, the reinforcement is passed through a die to remove excess resin, sandwiched between plies of release paper, passed through a set of heated rollers, cooled, and taken up on a spool. It is used within a few days or may be stored for months at 0° F.

During prepreg manufacture, the resin system "B-stages", or partially advances.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical cure temperatures are 100° F. to 500° F., preferably 180° F. to 450° F.

The compositions of this invention are well suited for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

Tacky drapable prepreg can be obtained with a wide variety of epoxy resins. Due to the low room temperature (25° C.) reactivity of the hardeners of this invention, long prepreg shelf lives can be obtained-typically one to three weeks.

For filament winding and wet layup, the preferred resin composition comprises epoxy resins selected from bis(2,3-epoxycyclopentyl)ether, bisphenol A epoxy resins of Formula II, where n=0 to 6, N,N,N',N'-tetraglycidylxylylene diamine, epoxidized novolak resins of Formulas III and IV, where n=0 to 3, and O,N,N-triglycidyl-4-aminophenol. The preferred epxoy resin mixtures have viscosities less than 30,000 centipoises at 70° C.

For all prepreg and composite formulations, the preferred molar ratio of N-H groups in the hardener to 1,2-epoxide groups in the epoxy resin is 0.5 to 1.5.

The compositions of this invention may be used as aircraft parts such a wing skins, wing-to-body fairings, floor panels, flaps, radomes; as automotive parts such as driveshafts, bumpers, and springs; and as pressure vessels, tanks and pipes. They are also suitable for protective armor on military vehicles and sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fiber in the composition may be replaced by filler. Thixotropic agents such as fumed silica may also be used.

EXAMPLES

The following examples serve to give specific illustrations of the practice of this invention but they are not intended in any way to limit the scope of this invention.

EXAMPLE 1

A 1 liter flask equipped with a paddle stirrer, thermometer with Therm-o-watch controller, Dean-Stark trap and condenser, nitrogen inlet, and heating mantle was charged with the following:
78.4 g. potassium carbonate
108.4 g. 4,4'-dichlorodiphenyl sulfone
115 ml toluene
265 ml N,N-dimethyl acetamide The mixture was stirred, purged with nitrogen, and heated to 80° C. The flask was then charged with 100 g. of 4-amino-3-methylphenol and heated to 160° C. as a toluene/water azeotrope was collected in the trap. Toluene in the distillate was initially recycled and then collected after most of the water was removed. The mixture was maintained at 155°-160° C. for 10 hours and then cooled to room temperature. After re-heating to 70° C., the mixture was filtered. The liquid filtrate was charged to a 5 liter flask containing 2 liters of methanol, heated to reflux and stirred as 1300 g of water were added over a one hour period. Heating was then discontinued and the mixture cooled to room temperature. A first crop of tan crystals was filtered out which had a melting point of 150°-152° C. after drying under vacuum. After standing, a second crop of crystals was collected from the filtrate which had a melting pont of about 148° C. The proton NMR of the product showed singlets at $\delta 2.2$ (6H) and 4.9 (4H), aromatic doublets at $\delta 7.9$ and 7.0, and a multiplet at 6.8 (total 14H), relative to tetramethylsilane as the internal standard. The product consisted of 4,4'-bis(4-amino-3-methylphenoxy)-diphenylsulfone.

EXAMPLE 2

A 1 liter flask equipped with a paddle stirrer, addition funnel, thermometer with Therm-o-watch controller, Dean-Stark trap and condenser, nitrogen inlet, and heating mantle was charged with the following:
50.0 g. 4,4'-dihydroxy 3,3',5,5'-tetramethyldiphenyl sulfone
200 ml dimethylsulfoxide
200 ml toluene The mixture was stirred, purged with nitrogen, and heated to 45° C. After 30 min. 26.15 g. of an aqueous solution of sodium hydroxide (titrated at 80.10 g/mole of hydroxide) was added from the addition funnel over 15 min. and the funnel rinsed with additional water. The mixture was heated to reflux as a toluene/water azeotrope was collected in the trap. The toluene was recycled for 3 hr. and then removed over the next 2 hr. during which time a white salt appeared on the sides of the reaction flask. The reaction was cooled to 130° C. and 51.43 g. of p-chloronitrobenzene were added over 15 min. and rinsed with additional dimethylsulfoxide. The temperature was raised to 150° C., and 50 g of oxalic acid were added as well as an additional 200 ml of dimethylsulfoxide. The mixture was poured into rapidly stirring water (about 1 part reaction mixture to 10 parts water) and the product precipitate was collected. After washing several times with water, the product was dried under vacuum to give a product which had a melting point of 218°-220° C. The proton NMR of the product showed singlets at δ2.2 and 7.8 and doublets at δ8.2 and 6.9 ppm relative to tetramethylsilane. The product was 4,4'-bis(4-nitro-phenoxy)-3,3',5 5'-tetramethyldiphenyl sulfone. The product yield was about 78 g.

The aforementioned dinitro product was then reduced to the corresponding diamine compound as follows:

A 3 liter flask equipped with a paddle stirrer, thermometer with Therm-o-watch controller, condenser, nitrogen inlet, and heating mantle was charged with the following:
  75 g. dinitro product
  200 g. stannous chloride dihydrate
  400 ml methanol
  400 ml concentrated hydrochloric acid The mixture was stirred, purged with nitrogen, and heated to reflux (~85° C.) for 5.5 hr. After cooling, the mixture was slowly poured into a 4 liter beaker containing 1 liter of water, 500 ml of a 50% sodium hydroxide solution, and ice. The resulting mixture was filtered and the collected solid material was washed twice with water. The solid was then placed in a Soxhlet apparatus and extracted with ethanol for 16 hr. After concentrating the ethanol extract to ~800 ml, the hot solution was treated with 200 ml water and cooled. Two crops of crystals were collected from the ethanol/water mixture. The first crop contained a mixture of starting material and the diamine product. The NMR of the second crop containing diamine only showed an aromatic region containing a singlet δ7.85 and doublets at δ6.67 and 6.94. The methyl group resonance was at δ2.14. The amine protons were exchange average in the DMSO solvent. The product was 4,4'-bis(4-amino phenoxy)-3,3',5, 5'-tetramethyldiphenyl sulfone.

EXAMPLE 3

A thermosetting composition was prepared by combining 32.5 g. of the diamine of Example 1 and 13.0 g. of a bisphenol A epoxy resin (EEW 189, Araldite 9527 from Ciba-Geigy) and 19.5 g. of bis(2,3-epoxycyclopentyl)ether. The mixture was prepared by charging both epoxy compounds to a 100 ml 3-neck flack equipped with a paddle stirrer, thermometer with Therm-o-watch controller, and vacuum outlet. The mixture was stirred and heated to 120° C. The diamine of Example 1 was added and quickly dissolved (about 2-3 minutes). Vacuum was applied and after about 15 min. the stirrer was stopped. After 2 more minutes the vacuum was removed and the fluid solution was poured into a glass mold with a cavity of dimensions 3/32×8.5 inches and cured with a programmed heating cycle: 16 hr. at 105° C., 8 hr. at 140° C., and 16 hr. at 175° C.

An uncured portion of the thermosetting composition was cooled to room temperature. It remained clear and retained tackiness for about one week.

The cured casting was tested for percent weight increase after soaking in water at 160° F. for two weeks and showed a gain of 2.8%.

A portion of the uncured thermosetting composition was tested by differential scanning calorimetry (DSC) using a programmed temperature rise of 10° C./min under a 500 psi nitrogen atmosphere. The composition showed a peak exotherm at 223° C.

Control A

A thermosetting composition was prepared by combining 31.5 of the unsubstituted diamine of the following structure

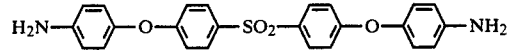

with 13.4 g. of a bisphenol A epoxy resin (EEW 189, Araldite 9527) and 20.1 g. of bis(2,3-epoxycyclopentyl)ether. The procedure of Example 3 was repeated except that the diamine required a significantly longer time to dissolve (~10 minutes) and the resulting mixture was higher in viscosity.

An uncured portion of the thermosetting composition was cooled to room temperature. It became opaque and was hard with no tackiness.

The cured casting was tested for percent weight increase after soaking in water at 160° F. for two weeks and showed a gain of 3.3%.

DSC testing of this composition by the same procedure as in Example 3 showed peak exotherm at 205° C., indicative of higher reactivity.

EXAMPLE 4

A thermosetting composition was prepared by combining 0.356 g. of the hardener from Example 2 and 0.134 g. of a bisphenol A epoxy (Araldite 9527) and 0.201 g. of bis(2,3-epoxycyclopentyl)ether. The materials were placed in a small vial in a bath at 100° C. with occasional stirring. After one hour a homogeneous solution was formed.

Control B

A thermosetting composition was prepared by combining 0.315 g. of a diamine of the following formula

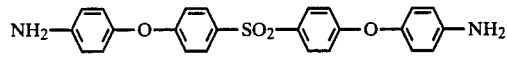

prepared from 1 equivalent of dichlorodiphenyl sulfone and 2 equivalents of para-aminophenol and 0.134 g. of a bisphenol A epoxy (Araldite 9527) and 0.201 g. of bis(2,3-epoxycyclopentyl)ether. The materials were placed in a small vial in a bath at 100° C. with occasional stirring. After one hour, the mixture was an opaque, inhomogeneous paste since the diamine had not completely dissolved.

What is claimed is:

1. A composition comprising:
(a) a diamine hardener represented by the following general formula:

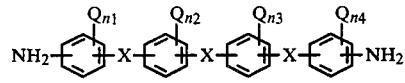

wherein the X's are independently selected from a direct bond, O, S, $SO_2$, CO, COO, $C(CF_3)_2$, $C(R_1R_2)_2$ wherein $R_1$ and $R_2$ are independently hydrogen or alkyl of 1 to 4 carbon atoms, Q is alkyl of 1 to 4 carbons atoms, $n_1$ through $n_4$ are independently 0 to 4 with the proviso that at least one of the n's is one or greater, and (b) an epoxy resin containing two or more 1,2-epoxide groups per molecule.

2. A composition as defined in claim 1 wherein the diamine is of the formula:

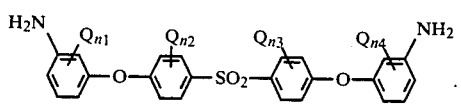

3. A composition as defined in claim 1 wherein the diamine is of the formula:

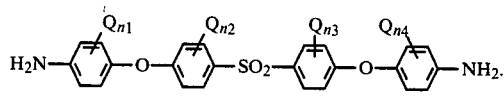

4. A composition as defined in claim 1 wherein the diamine is of the formula:

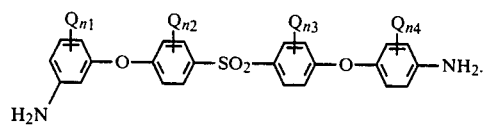

5. A composition as defined in claim 1 wherein the diamine is of the formula:

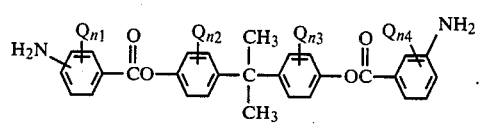

6. A composition as defined in claim 1 wherein the diamine is of the formula:

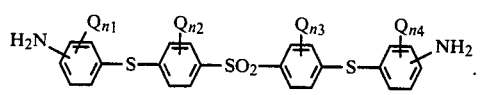

7. A composition as defined in claim 1 wherein the diamine is of the formula:

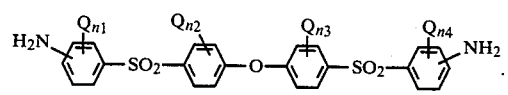

8. A composition as defined in claim 1 wherein the diamine is of the formula:

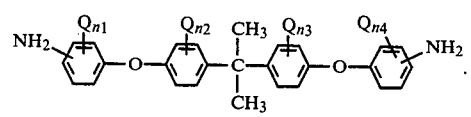

9. A composition as defined in claim 1 wherein the diamine is of the formula:

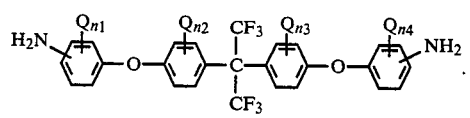

10. A composition as defined in claim 1 wherein the epoxy resin is bis(2,3-epoxycyclopentyl)ether.

11. A composition as defined in claim 1 wherein the epoxy resin is of the following structure:

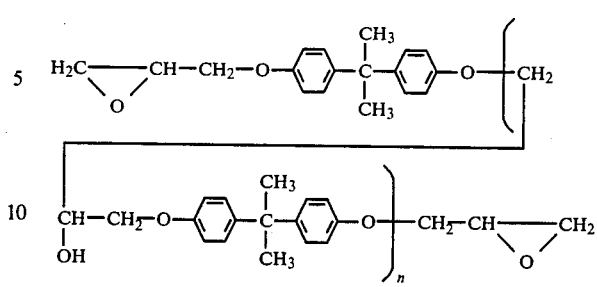

where n has a value from about 0 to about 15.

12. A composition as defined in claim 1 wherein the epoxy resin is a phenol-formaldehyde novolak of the following formula:

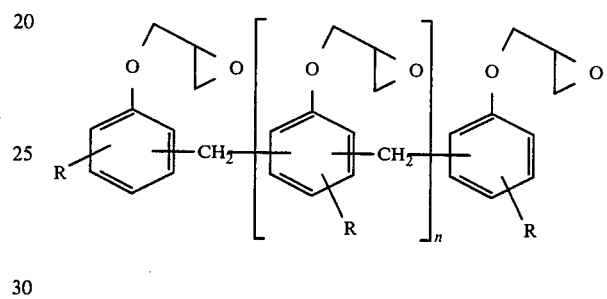

wherein n=0.1 to 8 and R=hydrogen.

13. A composition as defined in claim 1 wherein the epoxy resin is a cresol-formaldehyde novolak of the following formula:

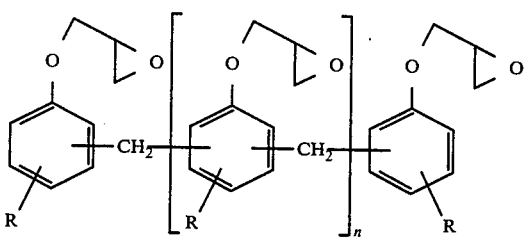

wherein n=0.1 to 8 and R is $CH_3$.

14. A composition as defined in claim 1 wherein the epoxy resin is N,N,N'N'-tetraglycidyl-4,4'-diaminodiphenyl methane.

15. A composition as defined in claim 1 wherein the epoxy resin is N,N,N',N'-tetraglycidylxylylene diamine.

16. A composition as defined in claim 1 wherein the epoxy resin is N,N-diglycidyl toluidine.

17. A composition as defined in claim 1 wherein the epoxy resin is N,N-diglycidyl aniline.

18. A composition as defined in claim 1 wherein the epoxy resin is N,N,N',N'-tetraglycidyl-bis(methylamino)cyclohexane.

19. A composition as defined in claim 1 wherein the epoxy resin is diglycidyl isophthalate.

20. A composition as defined in claim 1 wherein the epoxy resin is diglycidyl terephthalate.

21. A composition as defined in claim 1 wherein the epoxy resin is O,N,N-triglycidyl-4-amino phenol or O,N,N-triglycidyl-3-aminophenol.

22. A composition as defined in claim 1 wherein the epoxy resin is 3,4-epoxycyclohexylmethyl 3,4-epoxycyclohexane carboxylate.

23. A composition as defined in claim 1 wherein the epoxy resin is a N,N'-diglycidyl derivative of dimethylhydantoin.

24. A composition as defined in claim 1 which contains a structural fiber selected from carbon, graphite, glass, silicon carbide, poly(benzothiazole), poly(benzimidazole), poly(benzoxazole), alumina, titania, boron, and aromatic polyamides.

25. A composition as defined in claim 1 or 24 which contains a thermoplastic polymer.

26. A composition as defined in claim 25 wherein the thermoplastic polymer is selected from one or more of a poly(aryl ether), a polyhydroxyether, a polycarbonate, a poly($\epsilon$-caprolactone), a polybutadiene/acrylonitrile copolymer, a polyester, an acrylonitrile/butadiene/styrene copolymer, a polyamide, a poly(amide imide), a polyolefin, a polyethylene oxide, a polybutyl methacrylate, an impact-modified polystyrene, a sulfonated polyethylene, a polyarylate, poly(2,6-dimethyl phenylene oxide), polyvinyl chloride and its copolymers, polyphenylene sulfide and a polyacetal.

27. A composition as defined in claim 26 wherein the thermoplastic polymer is a polysulfone.

28. A composition as defined in claim 26 wherein the thermoplastic polymer is a polyhydroxyether.

29. A composition as defined in claim 26 wherein the thermoplastic polymer is a polycarbonate.

30. A composition as defined in claim 26 wherein the thermoplastic polymer is a polyetherimide.

31. A composition as defined in claim 26 wherein the thermoplastic polymer is a polyarylate.

32. A composition as defined in claims 1 or 24 or 26 which contains an accelerator which increases the rate of cure.

33. A composition comprising:
(a) a diamine hardener represented by the following general formula:

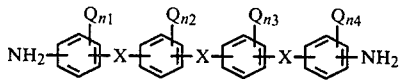

wherein the X's are independently selected from a direct bond, O, S, $SO_2$, CO, COO, $C(CF_3)_2$, $C(R_1R_2)_2$ wherein $R_1$ and $R_2$ are independently hydrogen or alkyl of 1 to 4 carbon atoms, Q is alkyl of 1 to 4 carbons atoms, $n_1$ through $n_4$ are independently 0 to 4 with the proviso that at least one of the n's is one or greater, and (b) bis(2,3-epoxycyclopentyl)ether.

34. A composition as defined in claim 33 which contains a structural fiber and/or thermoplastic polymer.

35. A prepeg comprising:
(a) a diamine hardener represented by the following general formula:

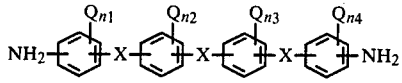

wherein the X's are independently selected from a direct bond, O, S, $SO_2$, CO, COO, $C(CF_3)_2$, $C(R_1R_2)_2$ wherein $R_1$ and $R_2$ are independently hydrogen or alkyl of 1 to 4 carbon atoms, Q is alkyl of 1 to 4 carbons atoms, $n_1$ through $n_4$ are independently 0 to 4 with the proviso that at least one of the n's is one or greater, and (b) an epoxy resin containing two or more 1,2-epoxide groups per molecule and (c) a structural fiber.

36. A prepreg as defined in claim 35 which contains an accelerator which increases the rate of cure.

37. A prepreg as defined in claims 35 or 36 which contains a thermoplastic polymer.

38. A composite comprising:
(i) a matrix resin comprising
(a) a diamine hardener represented by the following formulas:

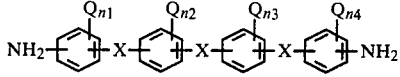

wherein the X's are independently selected from a direct bond, O, S, $SO_2$, CO, COO, $C(CF_3)_2$, $C(R_1R_2)_2$ wherein $R_1$ and $R_2$ are independently hydrogen or alkyl of 1 to 4 carbon atoms, Q is alkyl of 1 to 4 carbons atoms, $n_1$ through $n_4$ are independently 0 to 4 with the proviso that at least one of the n's is one or greater, and (b) an epoxy resin containing two or more 1,2-epoxide groups per molecule, and (c) a structural fiber.

39. A composite as defined in claim 38 wherein the epoxy resin was cured in the presence of an accelerator which increased the rate of cure.

40. A composite as defined in claims 38 or 39 which contains a thermoplastic polymer.

* * * * *